C. T. WALTER.
PNEUMATIC SHOCK ABSORBER.
APPLICATION FILED JULY 17, 1919.
1,386,818.
Patented Aug. 9, 1921.
4 SHEETS—SHEET 1.
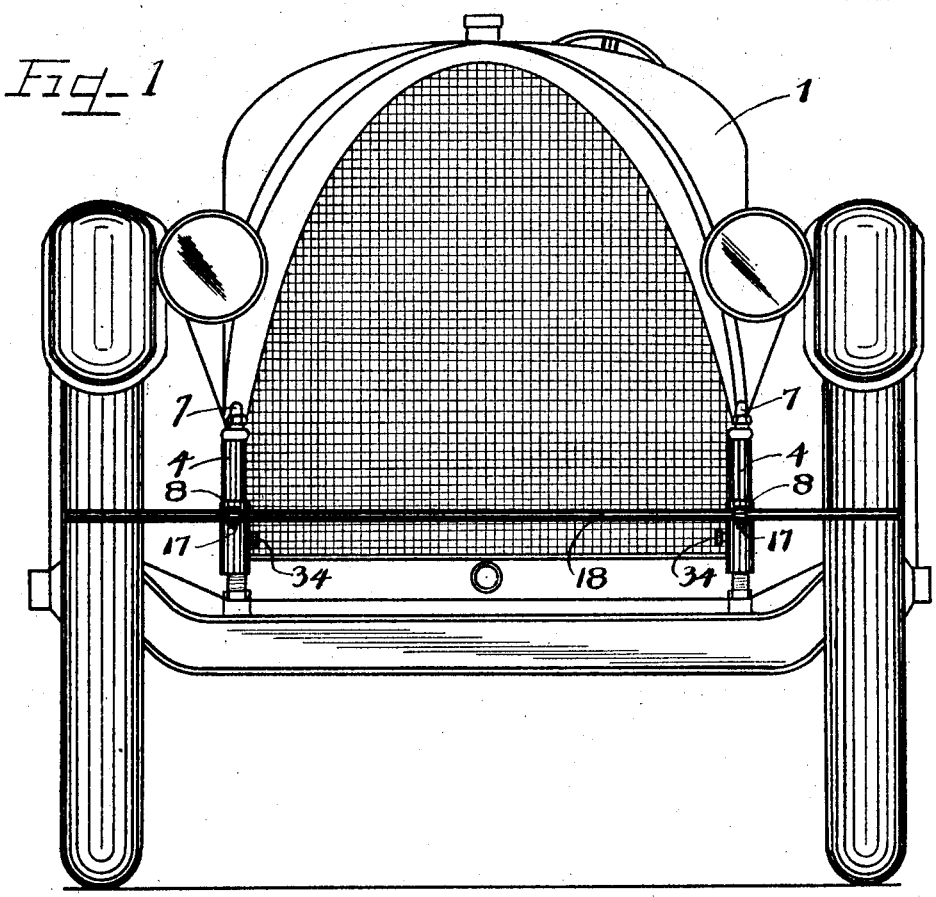
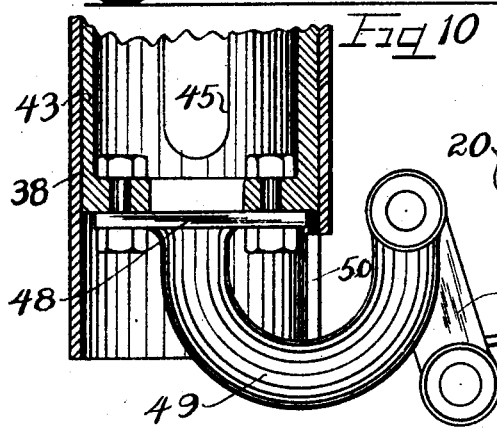
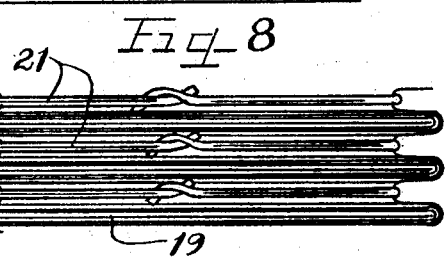

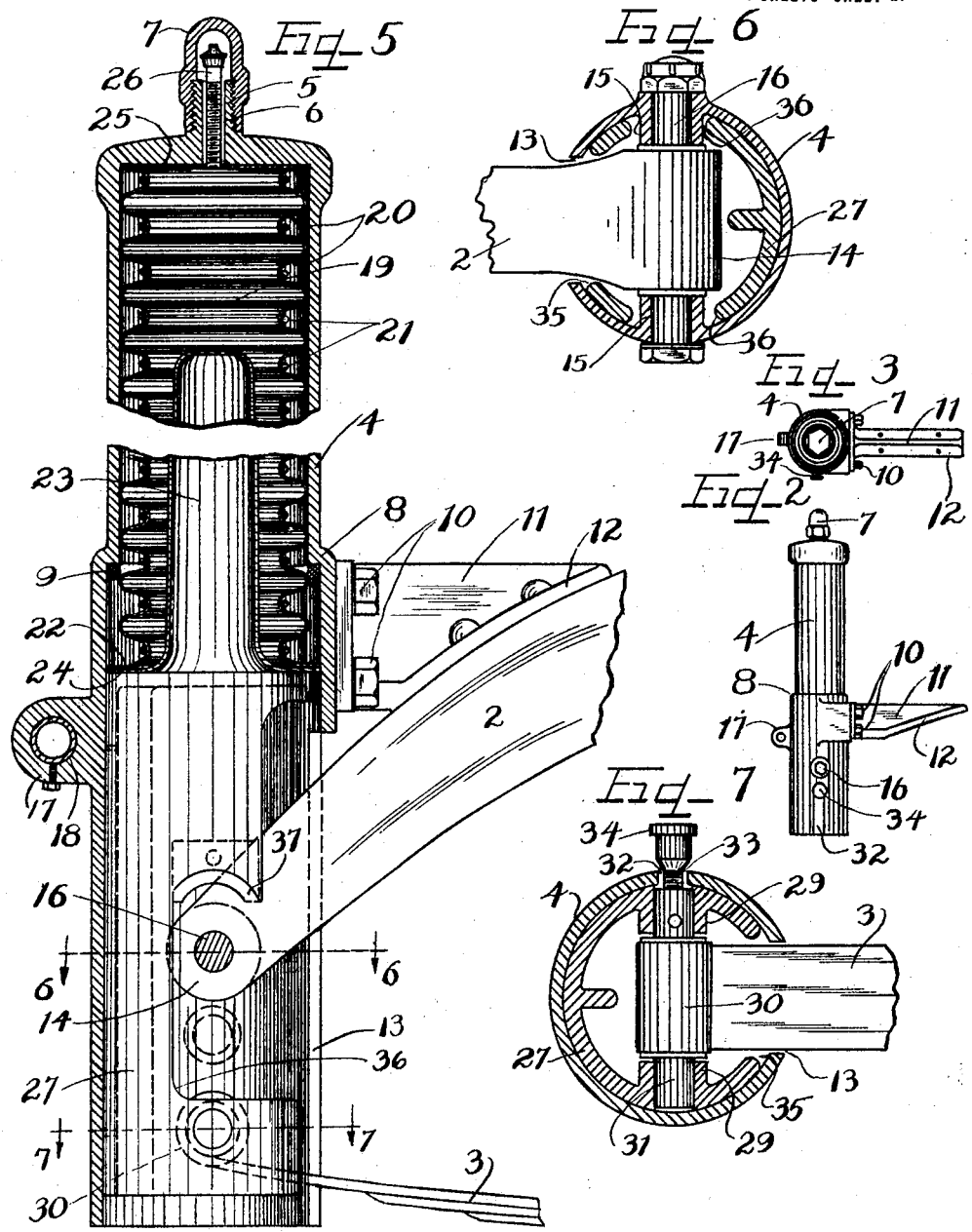

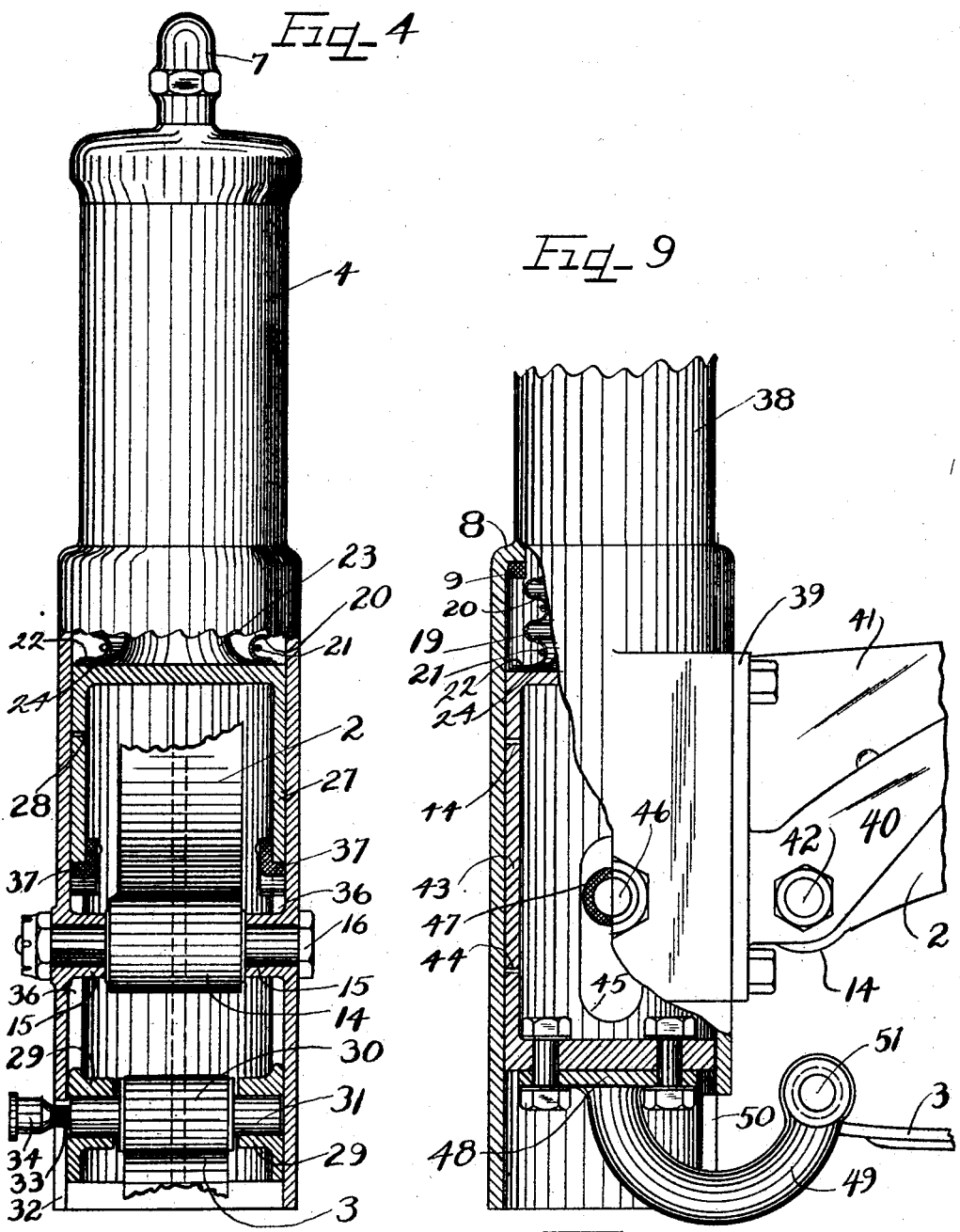

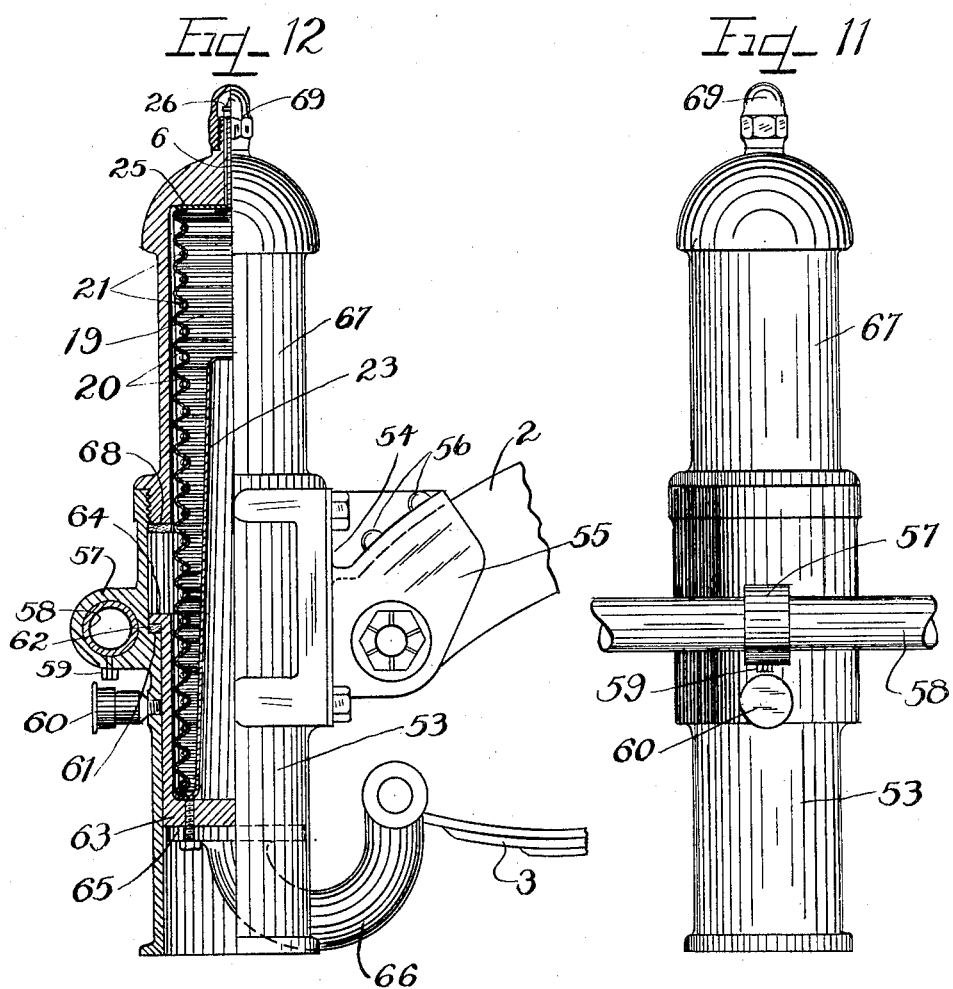

UNITED STATES PATENT OFFICE.

CHARLES T. WALTER, OF CHICAGO, ILLINOIS.

PNEUMATIC SHOCK-ABSORBER.

1,386,818. Specification of Letters Patent. Patented Aug. 9, 1921.

Application filed July 17, 1919. Serial No. 311,664.

*To all whom it may concern:*

Be it known that I, CHARLES T. WALTER, a citizen of the United States, and a resident of the city of Chicago, in the county of Cook and State of Illinois, have invented a certain new and useful Improvement in Pneumatic Shock-Absorbers; and I do hereby declare that the following is a full, clear, and exact description of the same, reference being had to the accompanying drawings, and to the numerals of reference marked thereon, which form a part of this specification.

This invention relates more particularly to an improved type of shock absorber adapted to be used on either or both ends of a vehicle to absorb shocks by means of pneumatic mechanisms.

It is an object of this invention to provide a shock absorber having a reinforced grooved cylindrical member adapted to resist compression by means of an air cushion therein.

It is also an object of the invention to provide a vehicle shock absorber wherein a slidable piston is adapted to compress a resilient air cushioned member seated thereon within a casing.

Another object of the invention is the construction of a vehicle shock absorber, the compressible member of which is adapted to be filled with air under pressure to afford a shock absorbing cushion.

A further object of this invention is the construction of a shock absorber wherein alined members abut one another within a casing to absorb shocks by means of pneumatic cushion formed by pumping air into one of said members.

It is furthermore an object of the invention to provide a shock absorber with a circumferentially reinforced corrugated cylindrical member adapted to resist compression by filling the same with air under pressure.

It is a further object of this invention to provide a shock absorber having an air valve to permit air cushions of different resistance to be formed in a resilient corrugated cylindrical compression member.

It is an important object of this invention to provide a vehicle shock absorber wherein a slidable piston member is adapted to compress a resilient pneumatically cushioned member having means projecting therein to reduce the volume thereof.

Other and further important objects of the invention will be apparent from the disclosures in the drawings and specification.

The invention (in a preferred form) is illustrated in the drawings and hereinafter more fully described.

On the drawings:

Figure 1 is a front elevation of an automobile equipped with shock absorbers embodying the principles of this invention.

Fig. 2 is a side elevation of a shock absorber removed from the automobile.

Fig. 3 is a top view thereof.

Fig. 4 is an enlarged front elevation of the shock absorber partly broken away and shown in section to disclose the construction of the plunger mechanism.

Fig. 5 is a central vertical section of the device partly broken away, and with parts shown in elevation.

Fig. 6 is a section taken on line 6—6 of Fig. 5, with parts in elevation.

Fig. 7 is a section taken on line 7—7 of Fig. 5, with parts in elevation.

Fig. 8 is an enlarged fragmentary portion of the compressible pneumatic member.

Fig. 9 is a fragmentary side view of a modified form of shock absorber partly broken away to show the construction.

Fig. 10 is a sectional view of the lower end of another modified form of the device.

Fig. 11 is a front elevation of another modified form of shock absorber.

Fig. 12 is a side elevation thereof with parts cut away and sectioned to show the interior construction.

As shown on the drawings:

The reference numeral 1, indicates an automobile provided with chassis sills 2, and front springs 3. Secured to the front end of each chassis sill 2, and to the corresponding front spring 3, is a pneumatic shock absorber.

The shock absorber comprises a cylindrical casing 4, open at the lower end, and having integrally formed centrally on the closed top thereof, an externally threaded neck 5, provided with an axial passage or opening 6. A cap 7, is removably threaded on the neck 5. The lower portion of the shock absorber casing 4, is of increased diameter to afford a shoulder 8, against the inner surface of which is seated a circular packing ring or cushioning ring 9. Rigidly secured to the rear of the casing 4, by bolts 10, or other suitable means is a mounting bracket 11 provided with a curved flange 12, adapted to be riveted or bolted to the curved upper flange of the chassis channel sill 2. The front end of the sill 2, is curved downwardly and projects into a vertical slot or opening 13, formed vertically in the rear of the lower part of the casing 4, below the bracket 11. A passaged head 14, is integrally formed on the front end of the sill 2. Integrally formed within the lower portion of the casing 4, on the inner surfaces of the side walls thereof, are a pair of oppositely disposed bearing sleeves 15, the passages of which register with the passage in the sill head 14, to permit a bolt 16, to project through the casing and the sill head 14, to further hold the shock absorber rigidly but removably secured in place at the front end of the automobile. Integrally formed on the front of the casing 4, is a passaged arm or support 17, through which the front bumper bar or rod 18, projects.

The compressible shock absorbing mechanism is removably mounted within the upper portion of the casing 4, as shown in Fig. 5, and embraces a cylindrical circumferentially grooved or corrugated resilient sleeve or tube 19, which may be made of thin resilient metal or other suitable material. Engaged in each of the grooves 20, of the sleeve 19, is a loop or ring of wire 21, the ends of which are twisted together to draw the wire tight. The wire loops 21, serve as reinforcing members for the resilient compressible sleeve 19, to prevent the same from becoming distorted. The sleeve 19 is adapted to be compressed longitudinally in the nature of a spring. The lower open end of the sleeve 19, projects below the casing shoulder 8, and is provided with an integral flange 22, of a diameter greater than that of the upper part of the casing 4. Projecting axially into the lower end of the sleeve 19, is a metal tube or core member 23, the upper end of which is closed, while the lower end is open and has integrally formed thereon an outwardly directed circular flange 24. The flange 24, is brazed or otherwise rigidly secured to the lower surface of the sleeve flange 22, to close the sleeve and form an air tight joint. A circular disk or plate 25, is brazed or otherwise tightly secured on the upper flanged end of the sleeve 19, to close the same, forming an air joint. For the purpose of pumping air into the compressible member, an air valve 26, is secured to the plate 25, and projects upwardly through the casing neck 5. The cap 7, incloses the projecting end of the valve 26.

Slidably mounted within the casing 4, below and supporting the compressible cushioning mechanism, is a plunger 27, the upper end of which is closed, and the lower end open. Lubricating vents 28, are provided in the walls of the plunger 27. Integrally formed within the lower end of the plunger 27, are a pair of oppositely disposed bearing collars or sleeves 29. Projecting through a loop or head 30, integrally formed on the front end of the automobile spring 3, is a pin 31, the ends of which are engaged in the plunger sleeves 29, thus holding the plunger in place within the casing 4. A slot 32, is formed in the lower part of one side of the casing 4, and projecting through said slot is the stem 33, of an oil cup 34. The oil cup stem 33, is engaged in one end of the bearing pin 31, of the spring 3. A slot or opening 35, is provided in the rear of the plunger 27, and registers with the opening 13, to permit the sill 2, and spring 3, to project into the plunger. An opening 36, is provided in each side of the plunger 27, to permit slidable movement of the plunger. The casing bearing sleeves 15, project through the plunger openings 36. Packing members or cushions 37, are secured to the plunger 27, at the upper ends of the openings 36, to afford a cushioning effect when the plunger is moved to contact the casing bearing sleeves 15.

Fig. 9, discloses a modified form of the device, wherein a shock absorber casing 38, has a bracket plate 39, bolted thereto. A bracket arm 40, is integrally formed on the bracket plate 39, and said arm is reinforced by a bracket web 41. The bracket arm 40, is rigidly secured to the front end of the automobile chassis sill 2, by a bolt 42, to hold the shock absorber in place.

Fig. 9 further shows a cylindrical plunger 43, closed at both ends, and engaging the lower end of the pneumatic shock absorbing mechanism. The plunger 43, is provided with lubricating vents 44, and with side slots 45. A bolt 46, is secured diametrically in the casing 38, and projects through the plunger slots 45. A packing sleeve 47, is engaged on the bolt 46, to produce a cushioning effect when the plunger engages against said bolt sleeve. Rigidly bolted to the bottom of the plunger 43, is a plate 48 which is integrally formed on the inner end of a curved connecting link or elbow 49. The elbow 49, projects outwardly through a rear slot or opening 50, formed in the rear of the lower part of the casing 38. The outer end of the connecting elbow 49, is connected to the spring 3, by a bolt or pin 51.

In the modified form of the device shown in Fig. 10, the construction is substantially the same as that already described, except that the outer end of the curved elbow 49, is connected to one end of a link 52, the other end of which is attached to the front end of the spring 3.

Figs. 11 and 12 disclose another modified form of shock absorber. In this case, the device comprises a lower casing section 53, having rigidly secured on the rear thereof a bracket plate 54, provided with an integral arm 55, and a reinforcing web 56. The front end of the automobile chassis sill 2, is bolted to the bracket arm 55. Integrally formed on the front of the lower casing section is an apertured support or arm 57, through which a bumper rod or bar 58, projects. A set screw 59, is provided to hold the bumper bar in place. An oil cup 60, is threaded into an opening formed in the front of the lower casing section, below the bumper supporting arm 57.

The lower casing section 53, is provided with a circular seat 61, on which a packing ring or cushioning washer 62, is seated. Slidably disposed within the lower casing section 53, is a cup shaped plunger 63, closed at the lower end and provided with an outwardly directed integral flange 64, at the upper open end thereof. The plunger flange is normally adapted to seat or rest on the packing ring 62. Bolted or otherwise rigidly secured to the closed bottom of the plunger 63, is a plate 65, which is integrally formed on the inner end of a curved connecting link or elbow 66. The elbow 66, projects outwardly through an opening or slot provided in the rear lower portion of the lower casing section 53. The outer end of the elbow 66, is adapted to be connected to the front end of the automobile spring 3.

Removably threaded into the upper open end of the lower casing section 53, is the lower end of an upper casing section 67. A packing ring 68, is secured to the inner end of the upper casing section 67, to afford a resilient cushion for the plunger flange 64, when heavy shocks are imparted to the plunger.

A compressible pneumatic shock absorbing mechanism is removably mounted in the casing sections 67—53, with the lower end projecting into the plunger 63, and with the upper end engaged against the closed top of the upper casing section. A cap 69, is removably engaged on the top of the upper casing section 67, to inclose the air valve. The compressible pneumatic mechanism is constructed similar to that shown in Fig. 5, and the parts are designated by the respective reference numerals hereinbefore used and described.

The operation is as follows:—

As shown in Fig. 1, a pair of pneumatic shock absorbers are mounted in place at the front of the automobile 1, and are attached to the sills 2, and the springs 3, as disclosed in Fig. 5. The supports 17, formed on the shock absorber casings 4, are positioned to support and hold the bumper rod or bar 18, in place.

To form a shock absorbing pneumatic cushion in the shock absorber, the air valve cap 7, is removed and an air pump is attached to the valve 26. Air is then pumped into the resilient compressible corrugated cylinder 19, until a desired pressure is reached. The pump is then removed and the valve cap 7, is again threaded into place on the casing 4. The shock absorber is now adapted for use, since the pneumatic cushion in the compressible cylinder 19, will absorb any shocks imparted to the automobile springs 3. Shocks sustained at the front wheels of the automobile are transmitted to the front axle and to the front springs 3. A shock received by one of the springs 3, is transmitted to the shock absorber plunger 27, and causes the same to move upwardly in the casing 4, thereby acting to compress the reinforced corrugated cylindrical member 19. The air under pressure in the compressible resilient cylinder 19, acts as a pneumatic cushion and resists or absorbs the shock. The core member 23, which is axially disposed in the cylinder 19, serves as an equalizing means for the air cushion, and also acts together with the reinforcing wire bands 21, to prevent distortion of the corrugated resilient compressible cylinder 19. If the shock imparted is sufficiently great, the plunger 27, will compress the cylinder 19, until the cylinder flange 22, will strike against the cushioning ring 9, within the casing 4. The packing or cushioning ring 9, acts to reduce the impact strain on the casing shoulder 8. The packing members 37, also produce a cushioning effect when they contact the casings bearing sleeves 15, upon the return of the plunger to normal position after the pneumatic cushion has absorbed a shock.

In the modified form of the device shown in Fig. 9, the operation of the shock absorber is substantially the same as that already described. In this case, however, the front end of the chassis sill 2, is secured to the bracket arm 40, by means of the bolt 42, while the spring 3, is attached to the outer end of the plunger actuating elbow 49.

Fig. 10, shows another modified form of attachment. In this instance the spring 3, is connected to the outer end of the curved elbow 49, by a connecting link 52.

The operation of the modified form of the device shown in Figs. 11 and 12, is the same as that already described. In this case, however, the plunger is adapted to permit the lower portion of the pneumatic compressible member to seat therein. The casing is formed of two removably connected sections to permit the operating parts to be readily removed.

It will, of course, be understood that the improved type of pneumatic shock absorber may be secured to the rear of an automobile or to any other device where shocks are liable to be received. The shock absorbing power of the compressible member is variable and depends upon the pressure of the air therein. The compressible member is removable as a whole for repairs or replacement.

I am aware that many changes may be made, and numerous details of construction may be varied through a wide range without departing from the principles of this invention, and I therefore do not purpose limiting the patent granted otherwise than necessitated by the prior art.

I claim as my invention:

1. A shock absorber comprising a casing, a plunger therein, and a compressible mechanism in said casing above said plunger, said mechanism embracing a resilient corrugated cylinder, circumferential members for reinforcing the same, means for closing the lower end of said cylinder and projecting axially therein, a plate for closing the upper end of the cylinder, and valve means connected with said plate adapted to permit air under pressure to be pumped into the cylinder to afford a pneumatic cushion therein.

2. A pneumatic shock absorber comprising a casing, a plunger slidable therein, a circumferentially grooved resilient mechanism in said casing above said plunger, a wire band engaged in each of the mechanism grooves to reinforce said mechanism, means for providing a compressed air cushion in said mechanism, and a core member forming a part of said mechanism and projecting axially therein to serve as an equalizing means for the air cushion.

3. A vehicle shock absorber embracing a casing, a compressible element therein, a slotted plunger in said casing below said compressible element and adapted to be connected to the vehicle spring, and a bolt to project through said plunger and secured to said casing to permit a vehicle sill to project into the casing and plunger to be attached thereto.

4. A vehicle shock absorber comprising a slotted casing, a compressible element therein, a bolt secured diametrically within said casing to permit one end of a vehicle sill to be secured thereto, a slotted plunger in said casing with said bolt projecting through the slots thereof, and means connecting one end of the vhicle spring with the lower end of said plunger.

In testimony whereof I have hereunto subscribed my name in the presence of two subscribing witnesses.

CHARLES T. WALTER.

Witnesses:
CHARLES W. HILLS, Jr.,
FRED E. PAESLER.